United States Patent [19]
Tanisaki et al.

[11] Patent Number: 5,340,618
[45] Date of Patent: Aug. 23, 1994

[54] METHOD FOR UTILIZING A PLASMA REACTION UNDER AN ATMOSPHERIC PRESSURE

[75] Inventors: Tatsuzo Tanisaki, Onomichi; Satiko Okazaki, No. 20-11, Takaidohigashi 2-chome, Suginami-ku, Tokyo; Masuhiro Kogoma, No. 843-15, Shimoniikura, Wako-shi, Saitama-ken, all of Japan

[73] Assignees: Kimoto Co., Ltd., Tokyo, Japan; Kimoto Tech, Inc., Cedartown, Ga.; Satiko Okazaki, Tokyo; Masuhiro Kogoma, Wako, both of Japan

[21] Appl. No.: 916,492

[22] Filed: Jul. 21, 1992

[30] Foreign Application Priority Data

Jul. 24, 1991 [JP] Japan ................... 3-273030

[51] Int. Cl.⁵ ............... B05D 3/06; B05D 7/00
[52] U.S. Cl. ................... 427/488; 427/535; 427/569; 427/213; 427/212
[58] Field of Search .......... 427/488, 489, 490, 491, 427/535, 536, 569, 575, 576, 212, 213

[56] References Cited

U.S. PATENT DOCUMENTS

| | | | |
|---|---|---|---|
| 4,810,524 | 3/1989 | Nakayama et al. | 427/213 |
| 4,859,493 | 8/1989 | Lemelson | 427/213 |
| 4,882,225 | 11/1989 | Fukui et al. | 427/215 |
| 4,940,521 | 7/1990 | Dinter et al. | 427/569 |
| 4,971,880 | 11/1990 | Hotomi et al. | 427/488 |
| 5,026,463 | 6/1991 | Dinter et al. | 427/536 |
| 5,141,772 | 8/1992 | Chatterjee | 427/213 |
| 5,143,671 | 9/1992 | Peters et al. | 427/213 |
| 5,186,974 | 2/1993 | Gribbin et al. | 427/536 |
| 5,234,723 | 8/1993 | Babacz | 427/488 |
| 5,284,676 | 2/1994 | Accuntius et al. | 427/213 |

*Primary Examiner*—Marianne Padgett

[57] ABSTRACT

A method is disclosed for the treatment of a powder by use of a plasma reactor under atmospheric pressure, comprising the steps of providing a reaction chamber having first and second electrodes covered with a dielectric, an upper gas exhaust means and a lower gas inlet means, feeding a fluidizing gas comprising a rare gas, a monomer gas or a mixture thereof through said gas inlet means into said chamber to agitate a powder to be treated in said chamber, concurrently removing said gas from said chamber through said gas exhaust means; and generating a glow plasma under atmospheric pressure in said chamber by applying a voltage to said first electrode and grounding said second electrode whereby said powder is provided with an anticorrosive surface treatment.

5 Claims, 1 Drawing Sheet

METHOD FOR UTILIZING A PLASMA REACTION UNDER AN ATMOSPHERIC PRESSURE

BACKGROUND OF THE INVENTION

1. Field of the Invention

This invention relates to a method for utilizing a plasma reaction under atmospheric pressure, and more particularly to a method for utilizing plasma reaction under the atmospheric pressure which can apply an anticorrosive effect to surfaces of pigment, dye, and cement powders by treating with high efficiency the surfaces thereof by utilizing a highly stabilized glow discharge plasma under atmospheric pressure.

2. Statement of the Prior Art

In general, a plasma is in a high ionization state of ions and electrons and thus in a neutral state. It is well known that such plasma is different from a neutral gas. This plasma can be artificially obtained by a gaseous discharge.

A film forming method and a surface improving method which utilize a low pressure glow discharge plasma have been generally known in art of application, and such methods have been applied in various industrial fields. One of the surface treatment methods utilizing the low pressure glow discharge plasma is the so-called organic plasma method which can effect thin film forming and surface treatment by forming an organic compound gas into a plasma. Further methods for producing a diamond powder and a super-fine powder or a method for surface improvement utilizing plasma in a vacuum chamber have been proposed.

However, in such a conventional surface treating method utilizing the low pressure glow discharge plasma, disadvantages are that a low pressure vacuum device or equipment is required on account of a reaction under a vacuum of $10^{-5}$ to $10^{-3}$ Torr, and a long time and high cost are required for production due to a discontinuous treatment (batch treatment).

Further drawbacks are that the equipment, treating time, and treating processes become substantially complicated and an additional step for treating a waste fluid is required, since in the surface treating method by means of the powder or the like, it is necessary to treat the surfaces of the pigment or the like in a wet process with a resin, various acids, alkalies, aerosol containing a surface active agent solution and the like, and to dry, grinding, and classification.

Heretofore, various methods for achieving the anticorrosive effect have been proposed.

(a) Descaling operation

Mechanical operation: improvement of metal itself, special chemical treatment, electrical treatment, forming of passive state compounds and the like;

Chemical operation: pickling (nitric acid, hydrochloric acid, phosphoric acid);

(b) Surface preparation

Blasting treatment, removing treatment of rubbishes, dusts, salts, acid vapors;

(c) Anticorrosive operation

Use of poisonous pigment (lead, mercury, arsenic);

Anticorrosive paints, painting treatment (under coat, intermediate coat, top coat treatment).

There are problems of poisoning due to dangers of intoxication by poisonous metals and solvents or dangers due to dust in the above operations. Further, the anticorrosive painting treatment requires an under coating. However, the middle painting and upper painting require various limitations and complicated steps. The pigment, metal powders, and the like are used as the paints. In particular, a white pigment and the like are subjected to treatment with acids such as hydrochloric acid or sulfuric acid to increase a whiteness degree. Also, an organic acid treatment is carried out to increase dispersion of the pigment. However, these treatments have an adverse effect in preventing corrosion.

SUMMARY OF THE INVENTION

An object of the present invention is to provide a method which can readily and inexpensively treat the surface of pigment, dye, and cement powders, thereby preventing direct corrosion caused on the pigment, dye, and cement powders in a gas phase manner using generation of a glow discharge plasma having a high reaction activity and high stability under the atmospheric pressure, preventing corrosions caused by moisture absorption from a painted surface by applying a plasma treatment under decreasing atmospheric pressure to the painted surface, decreasing environmental pollution caused by the solution treatment and the like, and eliminating a drying step.

In order to achieve the above object and overcome all problems in the prior method, this invention is directed to a method for utilizing a plasma reaction under atmospheric pressure which treats surfaces of the pigment, dye, and cement powders by a glow discharge plasma having a high activity and stability under atmospheric pressure to provide the anticorrosive effect with the surface thereof and which also treats the painted surface by the glow discharge plasma to effectively prevent corrosion caused by moisture absorption from the painted surface.

The method of this invention is intended to achieve anticorrosive effect to the surfaces of the pigment, dye and cement powder by selectively introducing a rare gas and a monomer gas alone or in combination or a solvent gas, organic acid or a or an aerosol containing a surface active agent solution alone or in combination into a reaction chamber composed of a high voltage applying electrode and a grounded electrode which are covered with a dielectirc, and effectively preventing the corrosion caused by the moisture absorption and the like by directly treating the painted surface with a glow discharge plasma, if necessary.

DETAILED DESCRIPTION OF THE PREFERRED EMBODIMENTS

Figure 1:
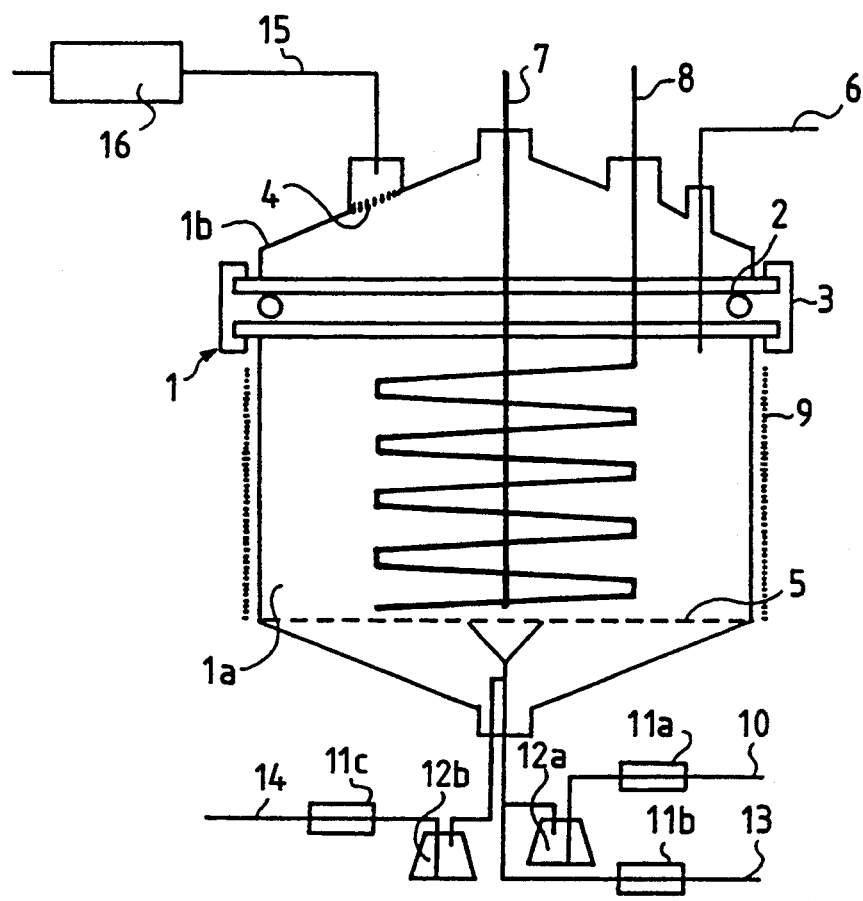
FIG. 1 is an explanatory view of an embodiment of an atmospheric pressure plasma reaction apparatus suitable for carrying out a method of this invention.

Referring now to the drawings, a plasma treating method for treatment of surfaces of the pigment, dye and cement powders in accordance with the present invention will be explained below.

FIG. 1 is an explanatory view of an embodiment of an atmospheric pressure plasma reaction apparatus suitable for carrying out a method in accordance with the present invention. In FIG. 1, a reaction chamber 1 may be, for example, a bell jar type of reaction chamber made of a "Pyrex" glass and comprises a lower chamber member 1a and an upper chamber member 1b mounted attachably and detachably on the lower chamber member 1a. In use, the upper chamber member 1b is jointed on the lower chamber member 1a through an O-ring 2 by a clamp 3. A filter 4 for preventing the pigment, dye and cement powders from scattering in the reaction chamber 1 is disposed on a part of the upper chamber member 1b. A mesh 5 is disposed in the lower chamber member 1a to prevent the pigment, dye and cement powders from scattering in or depositing on the bottom of the lower chamber member 1a. A vacuum exhaust pipe 6 is connected to the reaction chamber 1. In use of the reaction chamber 1, the air in the chamber will be exhausted through the vacuum exhaust pipe 6 to obtain a vacuum pressure of $10^{-3}$ Torr, when it is necessary to remove the air in the chamber or the pigment, dye and cement powders. A trap (not shown) may be provided between the vacuum exhaust pipe 6 and a vacuum pump (not shown), if necessary.

A linear grounded electrode 7 is disposed on the center line of the reaction chamber 1 in a linear manner. A high voltage applying spiral electrode 8 is arranged around the grounded electrode 7. A grounded electrode 9 is provided around the periphery of the lower chamber member 1a. Although the polarities of the grounded electrodes 7 and 9 and the high voltage applying electrode 8 may be reversed from each other, the above mentioned polarities will be preferable. The grounded electrode 9 may be arranged spirally or may be preferably formed in the form of a metal mesh or a metal mesh laminated with a dielectric on the both sides. In this case, glass, ceramics, plastics or the like may be used for the dielectric as coating materials.

A rare gas supply pipe 10 is connected to the bottom of the reaction chamber 1 through a flow meter 11a and a bubbling device 12a. Also, a monomer gas supplying pipe 13 is connected to the bottom of the reaction chamber 1 through a flow meter 11b. Gases can be supplied to the reaction chamber 1 through the rare gas supplying pipe 10 and/or the monomer gas supplying pipe 13 alone or in combination. Other gas supplying pipe 14 is connected to the bottom of the reaction chamber 1 through a flow meter 11c and a bubbling device 12b. A rare gas or a monomer gas alone or in combination can be supplied to the reaction chamber through the rare gas supplying pipe 10 and other gas supplying pipe 14. Rate of gaseous supply from the rare gas supplying pipe 10, the monomer gas supplying pipe 13, and other gas supplying pipe 14 is regulated by the flow meters 11a, 11b and 11c and introduced into the reaction chamber 1.

An exhaust gas pipe 15 is connected to the upper chamber member 1b of the reaction chamber 1. A filter 16 is provided on the way of the exhaust gas pipe 15. When the air in the chamber 1 is to be exhausted through the pipe 15, the filter 4 may have a mesh size which does not allow passage of the pigment, dye and cement powders but allow passage of the exhaust gas, such sizes being, for example, 0.01 to 250 microns, preferably 0.1 to 50 microns. When the rare gas such as He and the like is used repeatedly in the reaction chamber 1, the filter 4 is preferably of 0.01 to 5 microns in size.

Samples of the pigment, dye and cement powders are put on the center portion of the mesh 5 and are disposed within the reaction chamber 1 together with the supplying gas so that the samples may disperse within.

When a painted surface is treated with the plasma, a sample is put on the center portion of the mesh 5 and is treated in the same manner as that of treating the pigment, dye and cement powders.

Structure of the grounded electrode and the high voltage applying electrode 8 will now be explained by referring to FIG. 2.

Figure 2:
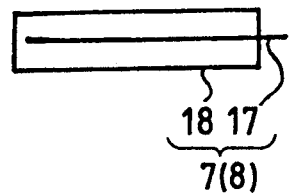
FIG. 2 is a cross sectional view of a grounded electrode and a high voltage applying electrode to be used in the atmospheric pressure plasma reaction apparatus.

FIG. 2 is an explanatory view showing the structures of the grounded electrode 7 and the high voltage applying electrode 8 used in the reaction chamber 1.

In FIG. 2, the grounded electrode 7 and the high voltage applying electrode 8 are formed by covering metal electrodes with a dielectric coating material 18. The dielectric coating material 18 may be of glass, ceramics, plastics or the like.

Next, an operation of the plasma discharge in the reaction chamber 1 will be explained.

Since the gasses to be introduced into the reaction chamber 1 are important elements to stabilize the glow discharge under the atmospheric pressure, the gasses will be explained in detail below.

The rare gases may be helium (He), neon (Ne), argon (Ar), nitrogen ($N_2$) or the like.

The monomer gas may be unsaturated hydrocarbon, and hydrocarbon having halogen functional group or not having the group. In particular, the hydrocarbon having the halogen functional group may be, for example, $CF_4$, $C_2F_4$, $C_3F_8$, $(CH_3)_3B$ and others.

The solvent for the solvent gas to be used as other gases may be hydrocarbon, halogenated hydrocarbon, alcohol, ether, acetal, ketone, ester, polyhydric alcohol and its derivatives, sulphur, phosphor, and other compounds, inorganic solvent fatty acid and phenol, nitride, and the like. It is suitable to select the above other gasses in accordance with the pigment, dye, cement powders and metals. It may also use these solvent gasses alone or in combination.

Organic acid to be used as other gasses may be carboxylic acid (RCOOH), sulfonic acid ($RSO_3$), sulfinic acid ($RSO_2$), phenol (ArOH), enol (RCH=C(OH)R), thiophenol (ArSH), imide (RCONHCOR), oxime (RCH=NOH), aromatic sulfonamide ($ArSO_2NH_2$), nitro compound ($RCH_2NO_2R_2CHNO_2$). Dissolution agent such as water, alcohol, solvent may be used.

The aerosol containing the surface active agent solution to be used as other gasses may be cation base, anion base, nonion base, silicon base, fluorine and fluorocarbon base, hydrocarbon base, fatty acid and amide, ester base, alcohol base, metallic soap and the like all being used alone, or in combination with a dissolution agent such as water, solvent and the like, and dispersing agent. All these may be any aerosol provided that they will not weaken adhesion to metal surface. In particular, the fluorocarbon base, ester base and the like may be preferable.

The pigment, dye and cement powders which can be treated are now explained. The pigment which can be treated may be either organic pigment or inorganic pigment. In particular, such organic pigments include:

a) Neutral nitro base: azo base, anthraquinone base, phthalocyanine base, azine base;

b) Anion base: triphenylmethane base, xanthene base;

c) Cation base: azo base, triphenolmethane base;

d) Others: dixanthine base, quinacridone base

Such inorganic pigments include:

a) White pigment, calcium carbonate ($CaCO_3$), titanium oxide ($TiO_2$), zinc oxide (ZnO), silicon dioxide ($SiO_2$), talc, calcium oxide (CaO), calcium phospate, all being made of inorganic compounds.

b) Pigment and metal fine powders containing vanadium (V), chromium (Cr), manganese (Mn), iron (Fe), cobalt (Co), nickel (Ni), molybdenum (Mo), tangsten (W), mercury (Hg), lead (Pb), antimony (Sb), sulpher (S), selenium (Se), all being made of colored transition metals.

c) Materials to be used as a paint clay mineral such as kaolinite, montmorillonite and the like d) Ceramics of metal oxide base etc.

e) Cement represented by portland cement, magnesia cement, alumina cement, silica cement and the like and in particular, materials used in contact with metal portions (iron frame, iron core etc.) and apatite.

The dyestuffs which can to be treated include:

a) Azo base, azometal base, azomethine base, dyeallylide base, monoazo base, anthanthrone base, pyranthrone base, perione base, isoindolinone base, quinophthalone base, anthrapyrimidine base, phthalocyanine base, indathrone base, perinone base, quinoline base, cumarin base, thioindigo base b) Dyestuffs containing metals (metallized dye).

The above mentioned pigment, dye and cement powders were weighed in a suitable amount which were then charged or introduced in the reaction chamber subsequently subjected to the atmospheric pressure plasma treatment for examining the anticorrosive effect. At the same time, the powders were stirred, dispersed or dissolved in a resin solution to form a paint which was applied to a metal surface for appraisal. After drying the painted metal surface, it was treated with the atmosperic pressure plasma to appraise the anticorrosive effect.

ANTICORROSIVE TEST A 2.0 g of pigments was charged in the reaction chamber and was subjected to the atmospheric pressure plasma treatment for ten minutes. 0.2 g of the treatment was stirred and dispersed in a distilled water of 20 ml and in a solution of salt of 4%.

The stirring was effected for ten minutes and the dispersion was made for thirty minutes in a paint shaker. After stirring or dispersing was made, the pigments were displaced in a beaker. Five steel balls degreased previously were immersed in each of the solutions, and the anitcorrosive effect was appraised for every predetermined time. Untreated pigment and dye were treated in the same manner and appraised.

The treating conditions and the result thereof are shown in Table 1.

The degreasing step is carried out by washing the steel balls with a neutral detergent, rinsing the steel balls in a distilled water followed by rinsing with an acetone for an hour to dry (90° C., 15 minutes). Further, the steel balls are immersed in an IPA and dried again (90° C., 15 minutes). A waterwetting test can confirm whether the degreasing is completed. Needless to say, steel balls which have been used in the water-wetting test are not used. The beaker is treated with the same manner for the testing vessels made of a plastic without plasticizer may be used.

TABLE 1

| Pigment/Dye | Treating Gas (Flow Rate ml/min.) | Frequency (KHz) | Load Power (W) | Treating Time (min.) | pH Distilled Water | pH Solution of Salt (4%) | Appraisal 1st Day Distilled Water | Appraisal 1st Day Solution of Salt (4%) | Appraisal 3rd Day Distilled Water | Appraisal 3rd Day Solution of Salt (4%) |
|---|---|---|---|---|---|---|---|---|---|---|
| Zinc Oxide | Untreated | — | — | — | 8 | 7 | 1 | 1 | 2 | 2 |
|  | He (2000) | 31 | 50 | 10 | 8 | 7 | 0 | 1 | 0 | 2 |
|  | CF4/He (54) (2000) | 21 | 50 | 10 | 8 | 7 | 1 | 1 | 2 | 1 |
| TiO2 | Untreated | — | — | — | 5 | 3 | 3 | 3 | 4 | 4 |
|  | He (2000) | 23 | 50 | 10 | 5 | 3 | 3 | 3 | 4 | 4 |
|  | CF4/He (54) (2000) | 31 | 50 | 10 | 5 | 3 | 1 | 0 | 1 | 0 |
| Kaolinite | Untreated | — | — | — | 5 | 3 | 0 | 2 | 3 | 4 |
|  | He (2000) | 21 | 50 | 10 | 5 | 3 | 2 | 2 | 4 | 4 |
|  | CF4/He (54) (2000) | 31 | 50 | 10 | 5 | 3 | 0 | 0 | 0 | 2 |
|  | H2O/He (60) (2000) | 31 | 50 | 10 | 5 | 3 | 2 | 2 | 3 | 4 |
|  | Phosphoric Acid (60) /He (2000) | 31 | 50 | 10 | 5 | 3 | 1 | 2 | 3 | 4 |
|  | *TMB/He (60) (2000) | 31 | 50 | 10 | 5 | 3 | 0 | 2 | 0 | 3 |
|  | **STY/He (35) (2000) | 31 | 50 | 10 | 5 | 4 | 0 | 2 | 0 | 3 |
| OK412 | Untreated | — | — | — | 5 | 3 | 1 | 1 | 2 | 2 |
|  | CP4/He (54) (2000) | 25 | 150 | 10 | 4 | 3 | 0 | 0 | 1 | 1 |
|  | PC430/He (6) (2000) | 24 | 75 | 10 | 5 | 6 | 2 | 1 | 3 | 2 |
| Apatite | Untreated | — | — | — | 7 | 5 | 2 | 2 | 3 | 3 |
|  | Formic Acid/He (60) (2000) | 24 | 75 | 10 | 6 | 4 | 0 | 1 | 2 | 2 |

| Pigment/Dye | Treating Gas (Flow Rate ml/min.) | Appraisal 5th Day Distilled Water | Appraisal 5th Day Solution of Salt (4%) | Appraisal 7th Day Distilled Water | Appraisal 7th Day Solution of Salt (4%) |
|---|---|---|---|---|---|
| Zinc Oxide | Untreated | 3 | 4 | 4 | 5 |

TABLE 1-continued

| | | 1 | 2 | 3 | 4 |
|---|---|---|---|---|---|
| | He (2000) | 1 | 3 | 3 | 3 |
| | CF$_4$/H3 (54) (2000) | 3 | 2 | 3 | 2 |
| TiO$_2$ | Untreated | 5 | 5 | 5 | 5 |
| | He (2000) | 4 | 4 | 4 | 4 |
| | CF$_4$/He (54) (2000) | 2 | 0 | 2 | 0 |
| Kaolinite | Untreated | 4 | 4 | 5 | 5 |
| | He (2000) | 4 | 4 | 4 | 4 |
| | CF$_4$/He (54) (2000) | 2 | 3 | 2 | 3 |
| | H$_2$O/He (60) (2000) | 4 | 5 | 4 | 5 |
| | Phosphoric/He Acid (60) (2000) | 4 | 4 | 4 | 4 |
| | *TMB/He (60) (2000) | 0 | 3 | 2 | 3 |
| | **STY/He (35) (2000) | 2 | 4 | 2 | 4 |
| OK412 | Untreated | 4 | 2 | 4 | 4 |
| | CP$_4$/He (54) (2000) | 1 | 1 | 2 | 1 |
| | PC430/He (6) (2000) | 3 | 2 | 3 | 2 |
| Apatite | Untreated | 4 | 4 | 4 | 5 |
| | Formic Acid/He (60) (2000) | 2 | 2 | 3 | 3 |

*TMB: Trimethyl Boron
**STY: Styrene Monomer

Method of Appraisal

The corrosions caused on the ball surfaces were observed every predetermined day(1st, 3rd, 5th and 7th days).

The corrosions caused on the surfaces of the five steel balls were appraised by an average area in percentage as shown in Table 2.

TABLE 2

| Appraisal | | | | | |
|---|---|---|---|---|---|
| 0 | 1 | 2 | 3 | 4 | 5 |
| No Corrosion | 1% or less | 10% or less | 50% or less | 80% or less | 100% (Corrosion on whole surface) |

EXAMPLE 1

2.0 g of zinc oxide (pigment) was discharged in the reaction chamber was treated with the atmosphric pressure glow plasma. The treating conditions and results are listed in Table 1. The results of a case in which only helium (He) was introduced in the reaction chamber at a rate of 2000 ml/min. and those of a case in which a mixed gas of CF$_4$/He was introduced therein at a rate of 54/2000 (ml/min.) are shown in Table 1. The treated zinc oxide of 0.2 g was weighed and dispersed in a distilled water of 20 ml and a solution of 4% of salt and displaced in a beaker degreased previously in the same manner described above. Five steel balls were degreased in the same beaker to appraise the anticorrosive effect. The balls were exposed for appraisal in the air at a temperature of 22° C. and a humidity of 65%. The anticorrosive effects were recognized in the CF$_4$/He treatment to the distilled water and the solution of salt.

EXAMPLE 2

TiO$_2$ (titanium, dioxide, rutile) of 2 g was treated with the plasma used in Example 1 to appraise the anticorrosive effect.

The treating conditions and results are shown in Table 1.

The remarkable anticorrosive effects were recognized in the CF$_4$/He treatment to the distilled water and in particular, to the solution of salt.

EXAMPLE 3

Kaolinite (clay mineral) was treated with the plasma used in Example 1 to appraise the anticorrosive effect.

Water, phosphoric acid, trimethyl boron, and styrene monomer were introduced into the reaction chamber while He was bubbling therein. The appraisal of the anitcorrosive effect was carried out after the atmospheric pressure plasma treatment was done.

The amounts of He in bubbling were 60, 60, 60 and 35(ml/min). The anticorrosive effect to CF$_4$/He, trimethyl boron and styrene treatments are recognized.

EXAMPLE 4

OK412 (silica fine particles) was treated with the plasma used in Example 1 to appraise the anticorrosive effect.

FC430 (fluorocarbon) of 1% aqueous solution was introduced into the reaction while He (6 ml/min) was bubbling therein. The appraisal of the anitcorrosive effect was carried out after the atmospheric pressure plasma treatment was done. The anticorrosive effect was recognized to the CF$_4$/He and FC430 treatments.

EXAMPLE 5

An apatite (cement for a denture) was treated with the plasma used in Example 1 to appraise the anticorrosive effect.

A formic acid was introduced into the reaction appraise while He (60 ml/min) was bubbling therein. The appraisal of the anticorrosive effect was carried out after the atmosphereic pressure plasma treatment had been done. The anticorrosive effect was recognized to the formic acid.

Anticorrosion Test B

The plasma-treated pigment and the like were stirred or dispersed in resin solutions to be form into a vehicle. It was previously described defated in the manner described above.

The vehicle was painted on an iron metal plate (37 mm×50 mm, 3 mm in thickness) and dried (120° C., 3 minutes). Further, it was applied on the opposite side of the plate and dried (120° C., 3 minutes). After both sides were dried, the vehicle were baked to be dried at 140° C. for 30 minutes to form a test sample.

Untreated pigments and the like were painted in the same manner. After baked to dry, the painted surfaces were treated with the atmospheric pressure plasma described above to appraise the anticorrosive effect.

One side of the treated sample was marked with a sign "X" with a knife and the other side was left as painted. It was immersed in a distilled water and a solution of salt of 4% in an amount of 80 ml. The appraisal of the anticorrosive effect was carried out every predetermined time.

The treating conditions and results are shown in Table 3.

TABLE 3

|  | Untreated OK412 Resin Solution | | | | Plasma-Treated OK412 Resin Solution | |
|---|---|---|---|---|---|---|
|  | I | I | II | III | I | II |
| Thickness of Dried Film (μ) | 12 | 12 | 12 | 12 | 12 | 12 |
| Drying Time (min.) (140° C.) | 30 | 30 | 30 | 30 | 30 | 30 |
| Plasma-Treated (ml/min.) CF4/He (100) (2000) | Made | Not made | Not made | Not made | Not made | Not made |
| Frequency (KHz) | 30 |  |  |  |  |  |
| Load Power (W) | 50 |  |  |  |  |  |
| Treating Time (min.) | 10 |  |  |  |  |  |
| Anticorrosion Effect | X Face / Back Face | X Face / Back Face | X Face / Back Face | X Face / Back Face | X Face / Back Face | X Face / Back Face |
| 1st Day Distilled Water | ⊙ ⊙ | ○ ○ | ○ ○ | ○ ○ | ⊙ ⊙ | ⊙ ⊙ |
| Solution of Salt (4%) | ⊙ ⊙ | ○ ○ | ○ ○ | ○ ○ | ⊙ ⊙ | ⊙ ⊙ |
| 3rd Day Distilled Water | ⊙ ⊙ | ○ ○ | ○ ○ | ○ Δ | ○ ○ | ⊙ ⊙ | ⊙ ⊙ |
| Solution of Salt (4%) | ⊙ ⊙ | ○ ○ | ○ ○ | ○ Δ | Δ Δ | ⊙ ⊙ | ⊙ ⊙ |
| 5th Day Distilled Water | ⊙ ⊙ | ○ ○ | ○ ○ | ○ Δ | ○ Δ | ⊙ ⊙ | ○ ○ |
| Solution of Salt (4%) | ⊙ ⊙ | ○ ○ | ○ ○ | ○ Δ | X X | | |
| 7th Day Distilled Water | ⊙ ⊙ | Δ ○ | Δ Δ | Δ Δ | Δ Δ | ○ ○ | ○ ○ |
| Solution of Salt (4%) | ⊙ ○ | Δ X | X Δ | X X | ⊙ ⊙ | □ ○ |

|  | Gold-Contained RedGE Resin Solution | | Metal Face |
|---|---|---|---|
|  | III | IV | — |
| Thickness of Dried Film (μ) | 12 | 12 | — |
| Drying Time (min.) (140° C.) | 30 | 30 | — |
| Plasma-Treated (ml/min.) CF4/He (100) (2000) Frequency (KHz) Load Power (W) Treating Time (min.) | Not made | Not made | Not made |
| Anticorrosion Effect | X Face / Back Face | X Face / Back Face | X Face / Back Face |
| 1st Day Distilled Water | ⊙ ⊙ | ⊙ ⊙ | ⊙ ○ |
| Solution of Salt (4%) | ⊙ ⊙ | ⊙ ⊙ | ○ ○ |
| 3rd Day Distilled Water | ⊙ ⊙ | ⊙ ⊙ | □ □ |
| Solution of Salt (4%) | ⊙ ⊙ | ⊙ ⊙ | Δ Δ |
| 5th Day Distilled Water | ○ ○ | ○ ○ | X X |
| Solution of Salt (4%) | ○ ○ | ○ ○ | X X |
| 7th Day Distilled Water | □ □ | □ □ | X X |
| Solution of Salt | Δ Δ | Δ Δ | X X |

TABLE 3-continued (4%)

Criterial for Appraisal:
⊚ Not corrosion
○ Red rust on mark "X"
□ Appearance of red rust
△ Floating of red rust
X Red rust corrosion

EXAMPLE 6

The anticorrosive effect was appraised for the painted on the iron metal plate by using OK412 of Example 4 and treated in the Anticorrosive test A.

(1) Mixture of resin solutions I, II and III and dye-used resin solution IV using untreated OK 412:

The resin solutions were painted on one side of an iron metal plate degreased previously (37 mm×50 mm, 3 mm in thickness) by a mayer bar and dried (drying condition: 120° C., 3 minutes). Further, the solutions were applied on the opposite side of the plate and dried (drying condition: 120° C., 3 minutes). After both sides were dried, the plate was baked to be dried at 140° C. for 30 minutes to form a test sample for anticorrosive effect. The details thereof are shown in Table 4.

TABLE 4

| | Resin Solution | | | |
|---|---|---|---|---|
| | I | II | III | IV |
| 1 OK412 (silica Degsa Co.) | 3.0 g | 6.0 g | 8.0 g | — |
| 2 Neozabon Red GE (BASF) | — | — | — | 3.0 g |
| 3 VMCH (Vinyl chloride/ vinyl acetate copolymer) UCC Co. | 17.0 g | 14.0 g | 12.0 g | 17.0 g |
| 4 T.L (solvent Ashland Co.) | 40.0 g | 40.0 g | 40.0 g | 40.0 g |
| 5 M.E.K(solvent Ashland Co.) | 40.0 g | 40.0 g | 40.0 g | 40.0 g |
| 6 Density of solid content (%) | 20.0 | 20.0 | 20.0 | 20.0 |
| 7 Pigment etc./resin rate | 18/85 | 30/70 | 60/40 | 15/85 |
| 8 Thickness of painted layer (u) | 60 | 60 | 60 | 60 |
| 9 Thickness of dried layer (u) | 12 | 12 | 12 | 12 |

A mark "X" is inscribed on one side of the sample by a knife so that the mark "X" reached the surface of the plate. The opposite side of the plate was left as painted. The plate was then immersed in a distilled water and a 4% salt solution in an amount of 80 ml. Then, it was exposed in the air (22° C., 65%) and appraised about the anticorrosive effect every predetermined time.

The sample was treated with the above-described atmospheric pressure plasma and then appraised for the anticorrosive effect.

(2) A sample was prepared from OK412 treated in Example 4 to appraise the anticorrosive effect.

(3) The criteria of appraisal is as follows:
 ⊚: No corrosion
 ○: Red rust on mark "X"
 □: Appearance of red rust
 △: Floating of red rust
 X : Red rust corrosion (4) Results
 a) In the untreated OK412, the corrosive effect was recognized in the sample treated with the atmospheric pressure plasma after baked, painted and immersed in the distilled water and the salt solution.
 b) In OK412 treated with the atmospheric pressure plasma, the anticorrosive effect was recognized in the sample immersed in the distilled water and the salt solution.
 c) In particular, the treating effect by the titainum oxide ($TiO_2$) was great.

Effect of the Invention

It will be apparent from the foregoing description that in accordance with the present invention it is possible not only to prevent the corrosion caused by the pigment, dye and cement powders by carrying out the atmospheric pressure glow plasma treatment while changing the treating gas in accordance with the pigment, dye and cement powders, but also to be able to expect the anticorrosive effect by painting direct on the metal surface. Further, it is possible to increase the anticorrosive effect by treating the paint with the atmospheric pressure glow plasma after drying the paint. In particular, it is possible to readily prevent the corrosion caused in the air by utilizing a plasma torch type of plasma generator, thereby provide greater use in industry and an efficient utilization.

What is claimed is:

1. A method for the treatment of a powder by use of a plasma reactor under atmospheric pressure, comprising the steps of:
 providing a reaction chamber enclosing a first, spiral shaped electrode surrounding a second linear shaped electrode coaxial with the first electrode and said chamber, each electrode covered with a dielectric, an upper dispersing gas exhaust means and a lower dispersing gas inlet means;
 providing a third electrode around the periphery of and coaxial with said reaction chamber;
 feeding a dispersing gas selected from the group consisting of a rare gas, a monomer gas or a mixture thereof through said gas inlet means into said chamber to disperse a powder to be treated in said chamber;
 concurrently removing said gas from said chamber through said gas exhaust means; and,
 generating a glow plasma under the atmospheric pressure in said chamber by applying a voltage to said first electrode and grounding said second and third electrodes whereby said powder is provided with an anticorrosive surface treatment.

2. The method of claim 1 wherein a solvent is fed into said reaction chamber together with said dispersing gas.

3. The method of claim 1 wherein an organic acid or an alkali gas is fed into said chamber together with said dispersing gas.

4. The method of claim 1 wherein an aerosol containing a surface active agent solution is fed into said chamber.

5. The method of claim 1 wherein said powder comprises a pigment, dye or cement powder.

* * * * *